(12) United States Patent
Krig et al.

(10) Patent No.: US 9,697,212 B2
(45) Date of Patent: *Jul. 4, 2017

(54) MANAGING CONSISTENT DATA OBJECTS

(71) Applicant: Intel Corporation, Santa Clara, CA (US)

(72) Inventors: Scott A. Krig, Santa Clara, CA (US); Stewart N. Taylor, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/194,014

(22) Filed: Jun. 27, 2016

(65) Prior Publication Data

US 2016/0306807 A1   Oct. 20, 2016

Related U.S. Application Data

(63) Continuation of application No. 14/757,635, filed on Dec. 23, 2015, which is a continuation of application
(Continued)

(51) Int. Cl.
*G06F 17/30* (2006.01)
*G06F 3/06* (2006.01)
(Continued)

(52) U.S. Cl.
CPC ...... *G06F 17/30076* (2013.01); *G06F 3/0638* (2013.01); *G06F 12/08* (2013.01); *G06F 17/30091* (2013.01); *G06F 17/30179* (2013.01); *G06F 17/30247* (2013.01); *G06F 17/30256* (2013.01); *G06F 17/30569* (2013.01); *G06T 1/20* (2013.01); *H04N 1/00204* (2013.01);
(Continued)

(58) Field of Classification Search
None
See application file for complete search history.

(56) References Cited

U.S. PATENT DOCUMENTS 5,566,315 A   10/1996   Milillo et al.
5,911,776 A   6/1999    Guck
(Continued)

OTHER PUBLICATIONS

"How to convert 16—bit 565 rgb value to 32 bit," by anuragkhanna8. In: Bytes IT Community (Oct. 20, 2006). Available at: http://bytes.com/topic/c/answers/552128-how-convert-1 6-bit-565-rgb-value-32-bit, 5 pages.
(Continued)

*Primary Examiner* — Bai D. Vu
(74) *Attorney, Agent, or Firm* — International IP Law Group, P.L.L.C.

(57) ABSTRACT

A method and system for managing consistent data objects are included herein. The method includes detecting an operation to store a consistent data object. Additionally, the method includes detecting an attribute for the consistent data object. Furthermore, the method includes storing the consistent data object based on the attribute. In addition, the method includes determining an additional format of the consistent data object is to be stored. The method also includes generating a second consistent data object based on the additional format and storing the second consistent data object.

25 Claims, 6 Drawing Sheets

Related U.S. Application Data

No. 13/566,421, filed on Aug. 3, 2012, now Pat. No. 9,389,794.

(51) Int. Cl.
  *H04N 1/00* (2006.01)
  *G06F 12/08* (2016.01)
  *H04N 1/32* (2006.01)
  *G06T 1/20* (2006.01)

(52) U.S. Cl.
  CPC ..... *H04N 1/32101* (2013.01); *H04N 1/32358* (2013.01); *H04N 2201/325* (2013.01); *H04N 2201/3225* (2013.01); *H04N 2201/3274* (2013.01); *H04N 2201/33378* (2013.01)

(56) References Cited

U.S. PATENT DOCUMENTS

| | | | |
|---|---|---|---|
| 6,085,199 A | | 7/2000 | Rose |
| 6,275,904 B1* | | 8/2001 | Chennupaty ........ G06F 9/30018 711/122 |
| 6,393,442 B1 | | 5/2002 | Cromarty et al. |
| 6,549,918 B1 | | 4/2003 | Probert et al. |
| 8,560,896 B2* | | 10/2013 | Zbiciak .............. H03K 19/0016 714/54 |
| 2003/0061439 A1 | | 3/2003 | Shau |
| 2008/0024834 A1 | | 1/2008 | Matsui |
| 2010/0042868 A1 | | 2/2010 | Apelbaum et al. |
| 2010/0165032 A1 | | 7/2010 | Yoshida |
| 2011/0161681 A1* | | 6/2011 | Dhuse ................. G06F 11/1092 713/193 |
| 2011/0296366 A1 | | 12/2011 | Arora et al. |
| 2011/0296399 A1 | | 12/2011 | Tugnawat et al. |
| 2012/0075319 A1 | | 3/2012 | Dally |
| 2012/0128241 A1 | | 5/2012 | Jung |
| 2012/0304178 A1 | | 11/2012 | Grove et al. |
| 2013/0335756 A1 | | 12/2013 | Bhaskaran et al. |

OTHER PUBLICATIONS

"Image tile formats," by Wikipedia (Jul. 23, 2011 revision). Available at: https://en.wikipedia.org/w/index.php?title=Image_file_formats&oldid=440938301n, 8 pages.

"Texture tiling and swizzling," by the Ryg Blog (Jan. 17, 2011 ). Available at: https://fgiesen.wordpress.com/2011 /01 /17/texturetiling-and-swizzling/, 12 pages.

"YUV," by Wikipedia (Jul. 28, 2011 revision). Available at: https://en.wikipedia.org/w/index.php?title=YUV&oldid=441795719, 9 pages.

"Online Compression Caching," by Plaxton et al. In: Scandinavian Workshop on Algorithm Theory, Gothenburg, Sweden, Jul. 2008 pp. 414-425 (2008). Available at: Springer-Verlag, Berlin Hidelberg.

"Managing Persistent Objects in a Multi-Level Store," by Stonebraker, Michael. In: Proc.; May 1991 ACM SIGMOD Int'l Conf. Management of Data (1991). Available at: ACM.

\* cited by examiner

200

300

600

MANAGING CONSISTENT DATA OBJECTS

RELATED APPLICATION

This application is a continuation of and claims priority to U.S. patent application Ser. No. 14/757,635 titled "MANAGING CONSISTENT DATA OBJECTS," which was filed on Dec. 23, 2015, which is a continuation of and claims priority to U.S. patent application Ser. No. 13/566,421 titled "MANAGING CONSISTENT DATA OBJECTS," which was filed on Aug. 3, 2012; both of these applications are entirely incorporated by reference

BACKGROUND

1. Field

This disclosure relates generally to managing data in a computing system and more specifically, but not exclusively, to managing consistent data objects in a computing system.

2. Description

As modern computing systems process an increasing amount of data, efficient management of the data can enhance the speed of execution of operations. The managed data can include data stored in a variety of formats and consistent data objects. In some computing systems, various applications and hardware components can generate different formats of the same consistent data objects. For example, digital image data can be stored in a variety of formats, such as RGB and YUV. If an application or hardware component requests a digital image of a new format, the digital image is then converted and copied in memory. The conversion of consistent data objects can be computationally expensive and maintaining multiple copies of data in different memory devices can consume additional memory space. Furthermore, storing multiple copies of data in different memory devices can result in different versions of the data existing in memory. A technique to manage and store multiple formats of a consistent data object can reduce the amount of memory used to maintain the consistent data object and reduce the number of instructions that a process is to execute during conversion between different formats of the consistent data object.

DETAILED DESCRIPTION

Embodiments described herein relate generally to techniques for managing consistent data objects of multiple formats in various levels of memory of a computing system. A consistent data object, as referred to herein, is any type of data structure that can store data according to any suitable number of attributes. In some embodiments, the computing system includes a data management module that can manage consistent data objects by storing and modifying consistent data objects in multiple formats. The data management module can manage consistent data objects according to various attributes such as a data lifetime attribute, cryptography attribute, memory hierarchy attribute, and data format attribute, among others.

In some embodiments, the data management module can store and manage a consistent data object, while the consistent data object can be viewed and modified in multiple data formats. For example, the consistent data object can be viewed and modified as an integer, fixed-point, or floating point data format of varying bit precision such as 8, 16, 32, 64, 128 or any other suitable precision. The data management module can automatically maintain the consistency of all the data format views of the consistent data object, which allows the data from the consistent data object to be open in multiple consistent views. In some embodiments, the data from the consistent data object can be accessed in any desired data format without a data conversion outside the data management module. The data management module can perform the data conversions and update the consistent data object, as well as keep all views of the consistent data object in sync. In other embodiments, the data management module can provide managed data conversions for read and write operations between consistent copies of the same data under different data format views.

Reference in the specification to "one embodiment" or "an embodiment" of the disclosed subject matter means that a particular feature, structure, or characteristic described in connection with the embodiment is included in at least one embodiment of the disclosed subject matter. Thus, the phrase "in one embodiment" may appear in various places throughout the specification, but the phrase may not necessarily refer to the same embodiment.

Figure 1:
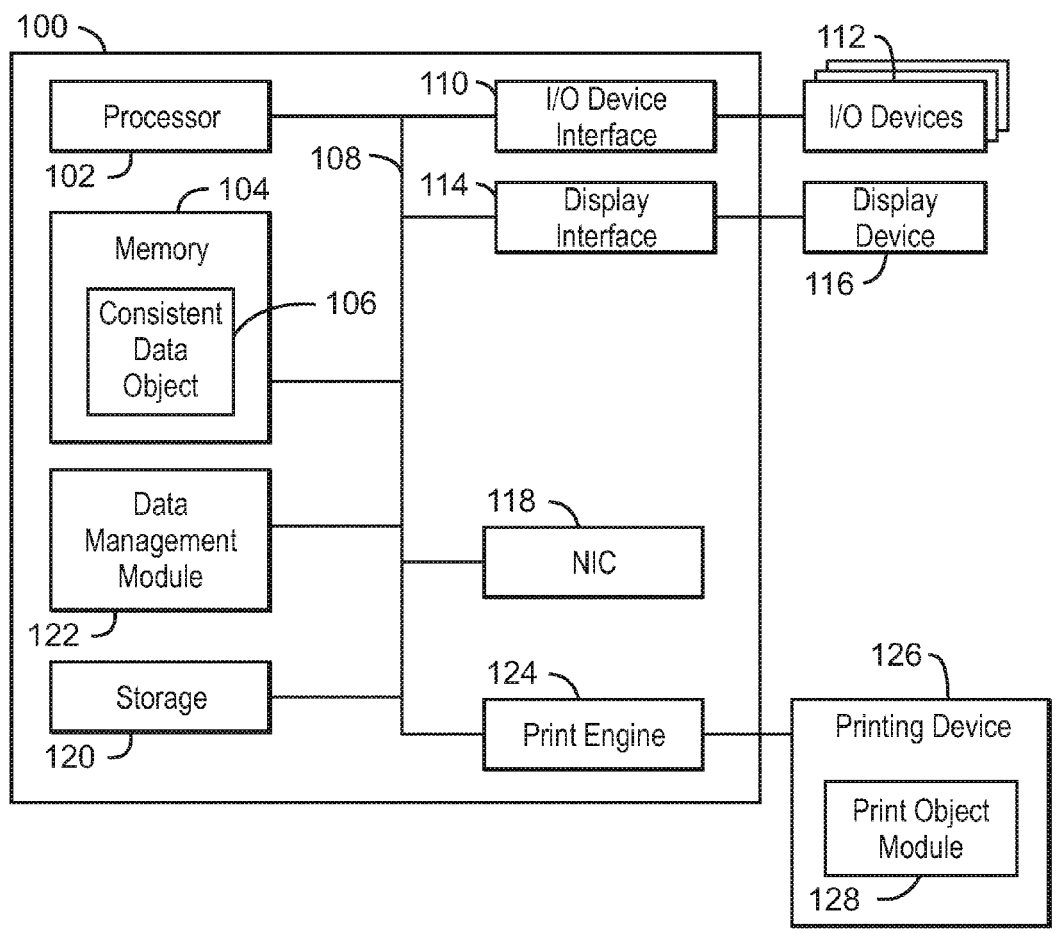
FIG. 1 is a block diagram of an example of a computing system that can manage consistent data objects.

FIG. 1 is a block diagram of an example of a computing system that can manage consistent data objects. The computing system 100 may be, for example, a mobile phone, laptop computer, desktop computer, scanning device, camera, imaging device, or tablet computer, among others. The computing system 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The memory device 104 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The memory device 104 can store consistent data objects 106 such as digital images or portions of digital images. The instructions that are executed by the processor 102 may be used to implement a method that includes manage consistent data objects.

The processor 102 may be connected through a system bus 108 (e.g., PCI, ISA, PCI-Express, HyperTransport®, NuBus, etc.) to an input/output (I/O) device interface 110 adapted to connect the computing system 100 to one or more I/O devices 112. The I/O devices 112 may include, for example, a keyboard and a pointing device, wherein the pointing device may include a touchpad or a touchscreen, among others. The I/O devices 112 may be built-in components of the computing system 100, or may be devices that are externally connected to the computing system 100.

The processor 102 may also be linked through the system bus 108 to a display interface 114 adapted to connect the computing system 100 to a display device 116. The display device 116 may include a display screen that is a built-in component of the computing system 100. The display device 116 may also include a computer monitor, television, or projector, among others, that is externally connected to the computing system 100.

A network interface card (NIC) 118 may be adapted to connect the computing system 100 through the system bus 108 to a network (not depicted). The network (not depicted) may be a wide area network (WAN), local area network (LAN), or the Internet, among others. A storage device 120 may also be connected to the processor 102 through a system bus 108. The storage device 122 can include a hard drive, an optical drive, a USB flash drive, an array of drives, or any combinations thereof. The storage device 122 may store applications that access consistent data objects 106.

The computer system 100 can also include a data management module 122 that manages the consistent data objects 106. The data management module 122 can be connected to the processor 102 through a system bus 108. In some embodiments, the data management module 122 can manage consistent data objects 106 by maintaining multiple copies of consistent data objects 106 in different formats. In other embodiments, the data management module 122 can manage consistent data objects 106 by converting the consistent data objects106 to a format requested by the processor 102. In some embodiments, the data management module 122 can send the consistent data objects 106 to a print engine 124 that can send the consistent data objects 106 to a printing device 126. The printing device 126 can include printers, fax machines, and other printing devices that can print the consistent data objects 106 using a print object module 128. The print object module is discussed in greater detail in relation to FIG. 6.

It is to be understood that the block diagram of FIG. 1 is not intended to indicate that the computing system 100 is to include all of the components shown in FIG. 1. Rather, the computing system 100 can include fewer or additional components not illustrated in FIG. 1 (e.g., additional memory devices, memory management modules, additional network interfaces, etc.). Furthermore, any of the functionalities of the data management module 122 may be partially, or entirely, implemented in hardware and/or in the processor 102. For example, the functionality may be implemented with an application specific integrated circuit, in logic implemented in the processor 102, in logic implemented in a memory management unit, in logic implemented in the print engine 124 or in logic implemented in the printing device 126, among others.

Figure 2:
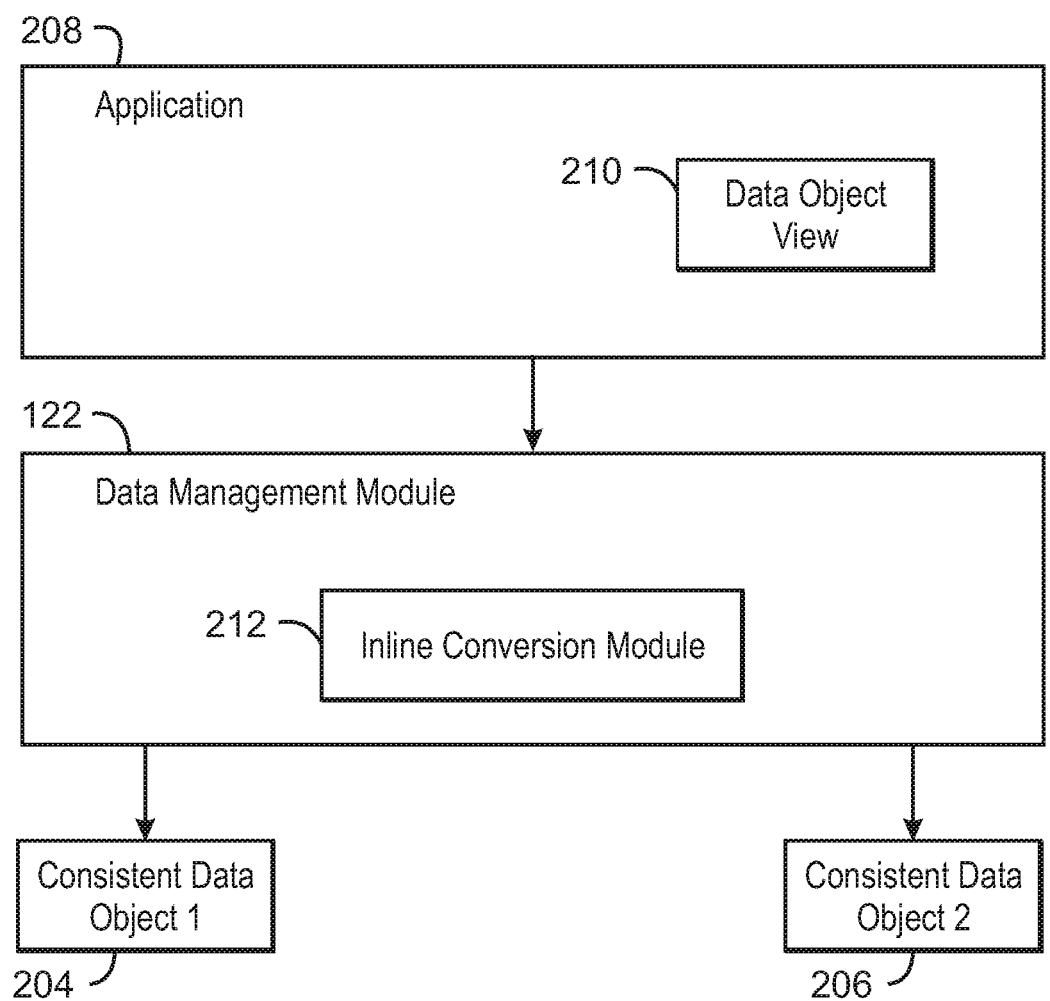
FIG. 2 is a block diagram of an example of a data management module for managing consistent data objects.

FIG. 2 is an example block diagram of a data management module managing consistent data objects. In some embodiments, the data management module 122 can be a hardware component of a computing system, such as the computing system 100 of FIG. 1. In other embodiments, the data management module can be a software component stored in storage 120 of FIG. 1.

A data management module 122 can store consistent data objects 204 and 206 based on instructions received from an application 208. In some embodiments, the data management module 122 can store data sets in multiple formats in consistent data objects 204 and 206. For example, the data management module 122 can store a 16-bit integer format of a digital image in a consistent data object 204. The data management module 122 can also store a 32-bit unsigned integer format of the same digital image in a consistent data object 206. The application 208 can access the consistent data objects 204 and 206 through data object views 210. The data object views 210 allow the application 208 to view any format of a data set. For example, the application 208 can request a data object view 210 from the data management module 122 of a 16-bit integer format of a data set. The data management module 122 can identify and retrieve a consistent data object 204 or 206 that contains a 16-bit integer format of the requested data set. If the data management module 122 cannot identify a consistent data object 204 or 206 that contains the requested data set in a 16-bit integer format, the data management module 122 can select a consistent data object 204 or 206 for conversion.

In some embodiments, the data management module 122 can include an inline conversion module 212. The inline conversion module 212 can convert a consistent data object 206 to a requested format when the requested format is not stored in a consistent data object 204 or 206. For example, the inline conversion module 212 can convert portions of a consistent data object 204 or 206 into the requested format as the data management module 122 retrieves the consistent data object 204 or 206. The inline conversion module 212 can execute conversion operations in parallel with the data management module 122 retrieving data from a consistent data object 204 or 206.

In some embodiments, the data management module 122 can return a consistent data object 204 or 206 based on attributes specified by the application 208. For example, the application 208 may instruct the data management module 122 to store consistent data objects 204 and 206 in a particular data format. The attributes for consistent data objects 204 and 206 are discussed in greater detail below in relation to FIG. 3.

It is to be understood that the block diagram of FIG. 2 is not intended to indicate that the data management module 122 is to include all of the components shown in FIG. 2. Rather, the data management module 122 can include fewer or additional components not illustrated in FIG. 1. For example, the data management module 122 may not include an inline conversion module 212. In this example, the data management module 122 can send instructions to a processor to convert a consistent data object 204 or 206 to a requested format. Additionally, some embodiments may allow multiple processors to access the data management module 122. In some embodiments, the data management module 122 can retrieve and send consistent data objects 204 and 206 to any number of different processors.

Figure 3:
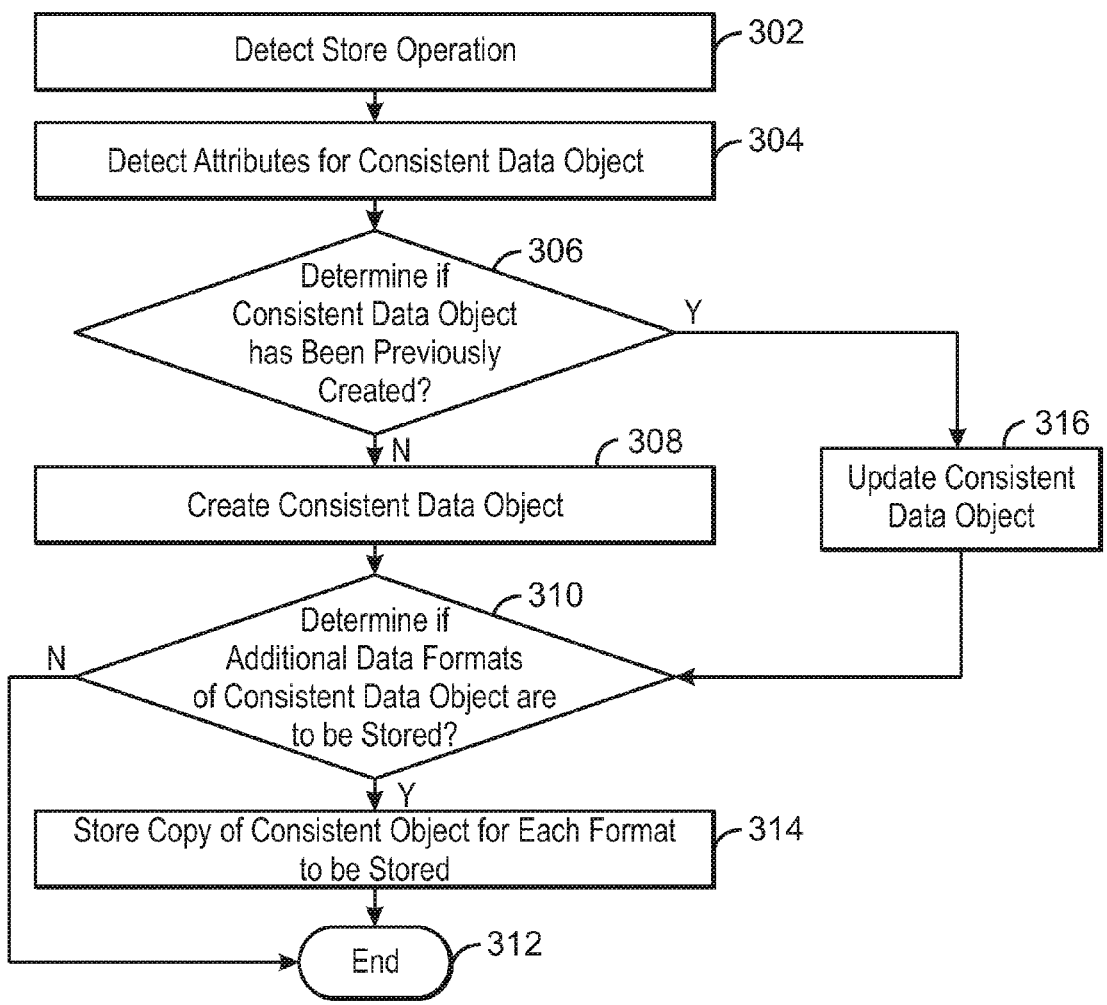
FIG. 3 is a process flow diagram illustrating an example of a method for storing a consistent data object.

FIG. 3 is a process flow diagram illustrating an example of a method for storing a consistent data object. The method 300 for storing a consistent data object may be implemented with a computing system 100, in which a data management module 122 manages consistent data objects. In some embodiments, the consistent data objects can be stored in memory 106.

At block 302 a data management module 122 detects an operation to store a data object. In some embodiments, the operation to store a data object (also referred to herein as a store operation) is generated by an application. For example, an application may send a store operation to the data management module 122 to store a digital image in a 32 bit integer format. In other embodiments, other hardware devices may send a store operation to the data management module 122. For example, a graphics processing unit may send a store operation to the data management module 122 to store a 64 bit digital image in a float format.

At block 304, the data management module 122 detects an attribute of the consistent data object. In some embodiments, a consistent data object can have any suitable number of attributes. For example, consistent data object attributes can include a local identifier attribute, a global identifier attribute, a data format attribute, memory hierarchy attribute, data lifetime attribute, cryptography attribute, object dimension attribute, object data layout attribute, object metadata attribute, and a public key attribute, among others. The local identifier attribute can identify a consistent data object within a common memory address space of a particular computing system or system on a chip. In one embodiment, the local identifier attribute can be a unique random number of a predetermined size. For example, a local identifier attribute can be a 64-bit number that identifies a particular consistent data object stored in a memory device of a computing system.

The attribute detected by the data management module 122 can also include a global identifier for the consistent data object. The global identifier attribute can allow a consistent data object to be identified remotely across a network or within an interconnected computing system with a different memory address space. For example, a global identifier may be a random number of a predetermined size that is unique to a particular consistent data object. In some embodiments, the global identifier may be generated based on a generating function that combines the system clock time with a random number. For example, a generating function may combine the system clock with a 32-bit random number to generate a 40-bit global identifier. In some embodiments, the data management module 122 may access a consistent data object with a global identifier attribute by negotiating a data transfer with a remote computing system through a communication method, such as serial data transmission, parallel data transmission, or through a networking protocol. For example, the data management module 122 may use a networking protocol to access a consistent data object that resides in a memory device of a remote computing system. In this example, the data management module 122 may identify the requested consistent data object in the remote computing system based on a global identifier that is unique to the requested consistent data object.

The attribute detected by the data management module 122 can also include a data format attribute which determines one or more canonical data formats of the consistent data object. A canonical data format, as defined herein, is a format of a data object expected to be frequently requested by an application or hardware component. The canonical format may be selected to minimize the number of data format conversions performed by the data management module 122. For example, if consistent data objects are frequently requested by an application as unsigned 16-bit integers, the canonical format for the consistent data object may be a 16-bit signed integer. The data management module 122 can detect the canonical data format or the canonical data format can be provided to the data management module 122 by an application or hardware component. In some embodiments, the data management module 122 can detect the format of a consistent data object that is most frequently requested. The data management module 122 can also set the most frequently requested data format as the canonical data format. The canonical data formats can include any number of different consistent data object formats such as 32-bit integer, 32-bit unsigned integer, 64-bit float, or a color format, among others. The color format allows the data management module 122 to perform color conversions at a speed equal to a direct memory access (DMA) rate. For example, an application may instruct the data management module 122 to extract the luminance channel from an RGB color image. After the luminance channel is modified by the application, the data management module 122 can store the luminance channel in the RGB color image.

In some embodiments, the data format attribute can also indicate a shadow copy format that stores two copies of the consistent data object. One copy of the consistent data object can include a tile-access set of data. A tile-access set of data can include a set of data that is partitioned into smaller segments. For example, a large digital image located in a storage device may have smaller segments of the digital image stored in memory. In this example, the data management module 122 may determine the frequently requested smaller segments of the digital image and store the frequently requested smaller segments in consistent data objects. The data management module 122 may also determine the size of the smaller segments based on the amount of data that can be stored in a cache line. For example, a set of data may include 2 MB of data for a digital image. However, a cache line may store 64 KB of data. In this example, the 2 MB set of data may be split into tiles of 64 KB, so each tile can be stored in a cache line. The second copy of the consistent data object can include a shadow copy of the tiled data kept in a buffer. The shadow copy can be a consistent data object that represents the larger set of data.

Continuing at block 304, the data management module 122 can also detect an attribute that can include a memory hierarchy attribute, which manages the location of the consistent data object within the memory hierarchy. In some embodiments, the memory hierarchy can include an L1 cache, L2 cache, GPU memory, DSP memory, Camera pipeline memory, media bus memory, shared virtual memory (SVM) memory, system memory, and network cache, among others. The memory hierarchy attribute can restrict the consistent data objects to reside in one particular level of memory. For example, the memory hierarchy attribute may indicate that the data management module 122 is to store a consistent data object in the L1 cache and the consistent data object is not to be stored in any other level of memory such as the L2 cache. In other embodiments, the memory hierarchy attribute may indicate that the data management module 122 can store the consistent data object in any level of memory. For example, the memory hierarchy attribute may indicate that the consistent data object may be migrated throughout various levels of memory based on the virtual memory policy of a computing system.

In other embodiments, the memory hierarchy attribute can also indicate that the data management module 122 is to implement a shadow copy format. For example, the data management module 122 may rearrange the data layout in memory if the data is to be accessed in tiled portions. The data management module 122 can rearrange the data layout in memory to accommodate tiled access of consistent data objects based on the size of the tiled portions. For example, a small portion of a consistent data object may represent a rectangular area of a digital image that is used in multiple operations. The data management module 122 can store the rectangular area of the digital image in cache to increase the execution speed of operations requesting the rectangular area of the digital image. In this example, additional portions of the digital image that are not requested for an operation can remain in storage and may not be stored in memory.

In some embodiments, the data management module 122 may keep a shadow copy of the data in an alternative addressing arrangement to allow for scatter/gather operations to access chosen memory regions. In some examples, the chosen memory regions can include image processing kernel patterns or sub-regions across an entire image, such as 3×3 regions, 5×5 regions, 10×20 regions, and other convenient region sizes. For example, the canonical data format may be arranged to optimize data access patterns for memory regions, where said re-arrangement may take the form of linear sets of regions stored together. The data management module 122 may also detect commands to optimize data access for chosen region sizes via attributes set for each consistent data object. In some examples, the attribute may indicate how to enforce the chosen optimized memory access for the selected region sizes, where said optimizations are performed for both read and write operations.

Continuing at block 304, the data management module 122 can also detect the consistent data object lifetime attribute, which determines when to send a consistent data object to another level of memory in the memory hierarchy. In some embodiments, the consistent data object lifetime attribute (also referred to herein as a lifetime attribute) can include a good until canceled option, cache only option, a local memory and higher option, and a system memory and higher option, among others. Each of the lifetime attribute options can indicate when the data management module 122 is to move a consistent data object from one level of memory to a second level of memory. For example, the good until canceled option can indicate that a data management module 122 is to store a consistent data object in memory until the data management module 122 deletes the consistent data object. The cache only option can indicate that a data management module 122 is to store a consistent data object in cache, such as L1 or L2, but the consistent data object is not to be stored in other levels of memory.

The attribute detected by the data management module 122 can also include a cryptography attribute. The cryptography attribute allows the data management module 122 to store a consistent data object in an encrypted format as part of the consistent data object's canonical format. In some embodiments, the cryptography attribute can allow the data management module 122 to store consistent data objects in a local computing system or a remote computing system. For example, a data management module 122 can store a consistent data object on a local computing system with an encryption attribute such as AER_256 encryption. The AER_256 encryption indicates the encryption method used by the data management module 122 to encrypt the consistent data objects. In other examples, a Network secure socket layer (SSL) can be used by the data management module 122 to encrypt consistent data objects accessed in remote computing systems.

Additionally, the attribute detected by the data management module 122 can include a dimensions attribute, which defines the size of the consistent data object. In some embodiments, the number of dimensions stored for the consistent data object can be indicated by the consistent data object dimensions attribute. For example, a data management module 122 may store a consistent data object with three dimensions in which 1024 data points are stored for the X and Y dimensions and zero data points are stored for the Z dimension. In other examples, fewer or additional dimensions may be stored for a consistent data object.

Continuing at block 304, the data management module 122 can detect a layout attribute, which allows for efficient access to the consistent data objects. In some embodiments, a variety of object data layouts may be supported. For example, the data management module 122 may store data according to data object layouts such as YUV 444, HSV 161616, LAB 161616, X Lines Y Columns, or 4 kb tiled access, among others. The YUV 444 data object layout can refer to a color space in which 4 KB of luminance and two separate 4 KB blocks of chrominance are stored for each consistent data object. The HSV 161616 data object layout can refer to a cylindrical-coordinate system in which the data management module 122 stores 16 KB of the hue, 16 KB of the saturation and 16 KB for the value of each consistent data object.

In addition, the data management module 122 can detect a metadata attribute. In some embodiments, the metadata attribute can include descriptive text that relates to a consistent data object. For example, the metadata for a consistent data object may include a description identifying the origin of a digital image. In this example, the metadata may include the text "This is an HG image from a VCR model XYZ at RGB at 6-bits per channel." In other examples, the data management module 122 can store multiple metadata texts that relate to a consistent data object.

The data management module 122 can also detect a public key for a consistent data object. In some embodiments, the public key allows the data management module 122 to store a consistent data object in secure storage in an encrypted format. If the data management module 122 detects a public key, the data management module 122 can implement a public key/private key encryption. For example, a data management module 122 can use a public key combined with a private key embedded in a computing system and only visible to the data management module 122 to encrypt consistent data objects.

At block 306 the data management module 122 determines if the consistent data object to be stored in memory has previously been created. The data management module 122 can determine if a consistent data object has been previously created by comparing attributes of the data object to be stored with attributes of the previously created consistent data objects. For example, the local identifier or global identifier of the data object to be created may correspond with a local identifier or global identifier of a previously created consistent data object. In other embodiments, the data management module 122 can detect the memory hierarchy attribute of the data object to be created and search particular levels of memory for a corresponding previously created consistent data object.

In some embodiments, the data management module 122 stores multiple canonical data formats of consistent data objects. For example, a consistent data object may be stored as a 32-bit unsigned integer and a 16-bit integer. In some embodiments, the data management module 122 can compare the consistent data object to be stored in memory with previously created consistent data objects. In some examples, the data management module 122 may convert the consistent data object to be stored in memory to additional formats for comparison with previously created consistent data objects. For example, the data management module 122 may store consistent data objects in two formats. The data management module 122 in this example may convert the consistent data object to be stored into each of the two stored formats to determine if the consistent data object to be stored in memory has previously been created.

If the consistent data object to be stored in memory has not been previously created, the process continues at block 308. At block 308, the data management module 122 creates the consistent data object. The data management module 122 creates the consistent data object according to the previously detected attributes. For example, a local identifier may be stored with the consistent data object. Additional attributes can identify how the data management module 122 is to store the consistent data object. For example, the data format of the consistent data object can determine if the consistent data object is to be stored in a 16-bit integer format or a 32-bit floating data type, among others. The memory hierarchy attribute may determine if the consistent data object is to be stored within a particular memory level. For example, the memory hierarchy may indicate that the data management module 122 is to store the consistent data object in L1 cache. In some embodiments, any number of attributes may be detected and stored with each consistent data object.

At block 310, the data management module 122 determines if additional data formats of the consistent data objects are to be stored. In some embodiments, the data management module 122 can determine if the consistent data object is to be stored in additional data formats based on the previously detected data format attribute. The data management module 122 may store multiple formats of each consistent data object. For example, two canonical formats of a consistent data object may be stored, so that the consistent data object is stored as a 32-bit unsigned integer and a 64-bit floating-point. If additional data formats of the consistent data object are not to be stored, the process ends at block 312. If additional data formats of the consistent data objects are to be stored, the process continues at block 314.

At block 314, the data management module 122 stores a copy of the consistent data object for each data format to be stored. In some embodiments, each copy of the consistent data object may include common attributes. For example, multiple copies of a consistent data object may share a common local identifier, global identifier, memory policy, data lifetime policy, public encryption key and cryptography policy. The multiple copies of a consistent data object may also contain attributes that are not shared. For example, the canonical data format may differ between consistent data objects, so that the consistent data object is stored as both a 16-bit integer and a 32-bit floating-point data type. The process ends after the data management module 122 stores a copy of the consistent data object in memory for each data format that is to be stored in memory.

As discussed above at block 306, the data management module 122 determines if the consistent data object to be created has been previously stored in memory. If the consistent data object exists in memory, the process continues at block 316. At block 316, the data management module 122 updates the consistent data object in memory. In some embodiments, the data management module 122 can update the data stored in a consistent data object or the attributes of the consistent data object. For example, the data management module 122 can update the memory hierarchy attribute of a consistent data object. In this example, the consistent data object may be stored in any level of memory instead of storing the consistent data object in a cache. The process continues at block 310.

The process flow diagram of FIG. 3 is not intended to indicate that the steps of the method 300 are to be executed in any particular order, or that all of the steps of the method 300 are to be included in every case. For example, any number of attributes can be detected for a consistent data object. In some examples, the consistent data objects may not include a public encryption key or cryptography policy. Further, any number of additional steps may be included within the method 300, depending on the specific application.

Figure 4:
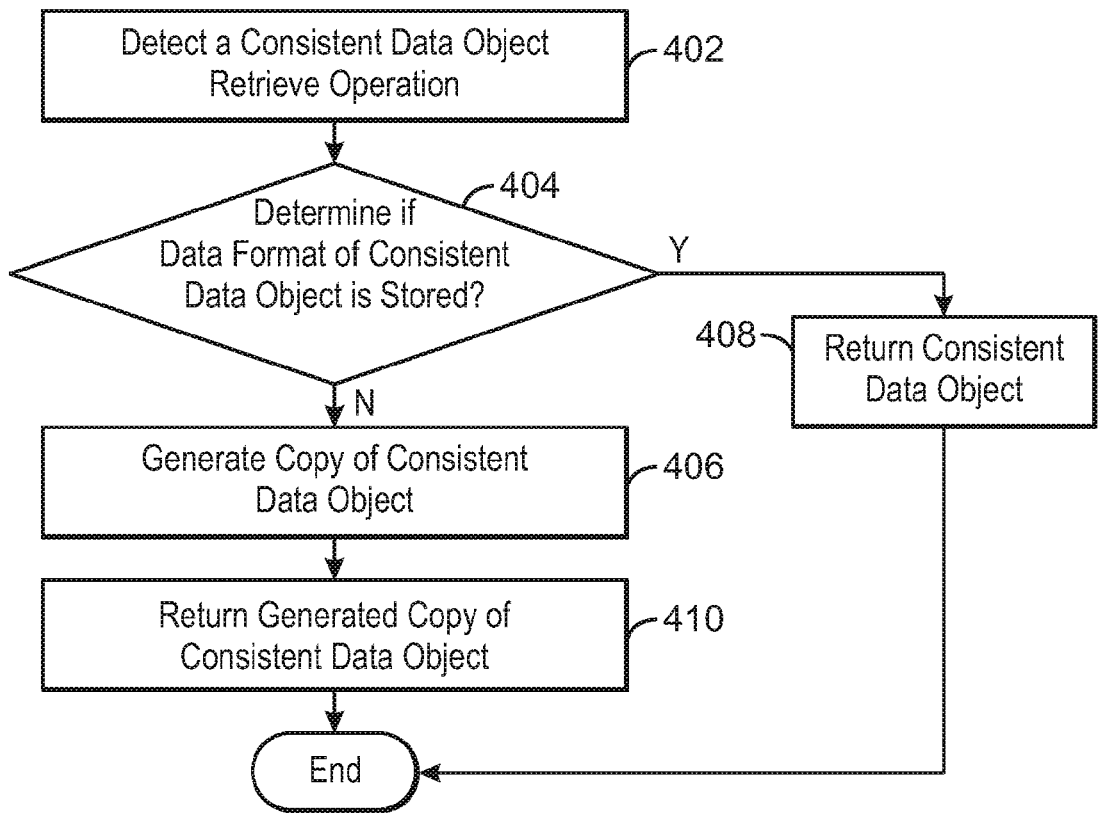
FIG. 4 is a process flow diagram illustrating an example of a method for accessing a consistent data object.

FIG. 4 is a process flow diagram illustrating an example of a method for accessing a consistent data object. The method 400 for accessing a consistent data object may be implemented with a computing system 100, in which a data management module 122 manages consistent data objects. In some embodiments, the consistent data objects can be stored in memory 106.

At block 402, the data management module 122 detects a consistent data object retrieve operation. The consistent data object retrieve operation may include any operation that attempts to retrieve data stored in a consistent data object managed by the data management module 122. In some embodiments, the data management module 122 can detect the format of the consistent data object to retrieve based on the parameters of the consistent data object retrieve operation. For example, a data read operation may indicate that the data management module 122 is to retrieve a 32-bit integer format of a consistent data object from memory.

At block 404, the data management module 122 determines if the data format of the consistent data object to be retrieved is stored in memory. In some embodiments, the data management module 122 can determine if the data format of a consistent data object is stored in memory by comparing the local identifiers or global identifiers. The data management module 122 can also identify a specific memory device to search for the consistent data object to be retrieved based on the memory hierarchy attribute. For example, the data management module 122 may detect a memory hierarchy attribute that indicates the consistent data object to be retrieved may be stored in L1 cache. If the data format of the requested consistent data object is not stored in memory, the process continues at block 406. If the data format of the requested consistent data object is stored in memory, the process continues at block 408.

At block 406, the data management module 122 generates a copy of the consistent data object in the requested format. In some embodiments, the data management module 122 may locate a format of the consistent data object to be retrieved that was not requested. As discussed above, the consistent data object can be viewed and modified as any suitable data format of varying bit precision such as 8, 16, 32, 64, 128 or any other suitable precision. For example, the data management module 122 may detect a request for a consistent data object in a 16-bit integer format. The canonical data formats of the consistent data object stored by the data management module 122 may be a 32-bit integer format and a 64-bit integer format. In some embodiments, the data management module 122 may include an inline conversion unit that converts the stored data format of the consistent data object to the requested data format. In other embodiments, the data management module 122 may detect the number of requests of a consistent data object in a particular data format. If a data format is frequently requested but not stored, the data management module 122 may add the requested data format as a canonical format. In other embodiments, the data management module 122 may replace a data format that is infrequently used.

At block 410, the data management module 122 returns the generated copy of the consistent data object in the requested format. In some embodiments, the data management module may return only a requested portion of the consistent data object based on the parameters of the consistent data object access operation. The process ends after the data management module 122 returns the requested format of the consistent data object.

If the data management module 122 determines that the data format of the requested consistent data object is stored in memory, the process continues at block 408. At block 408, the data management module returns the requested data format of the consistent data object. The process ends after the data format of the requested consistent data object is returned.

The process flow diagram of FIG. 4 is not intended to indicate that the steps of the method 400 are to be executed in any particular order, or that all of the steps of the method 400 are to be included in every case. Further, any number of additional steps may be included within the method 400, depending on the specific application. For example, in some embodiments the requested data format of the consistent data object can be sent to an application or a display engine. A display engine, as defined herein, can include any software or hardware components that can display data. In some examples, the display engine can include display devices or other devices capable of displaying data.

Figure 5:
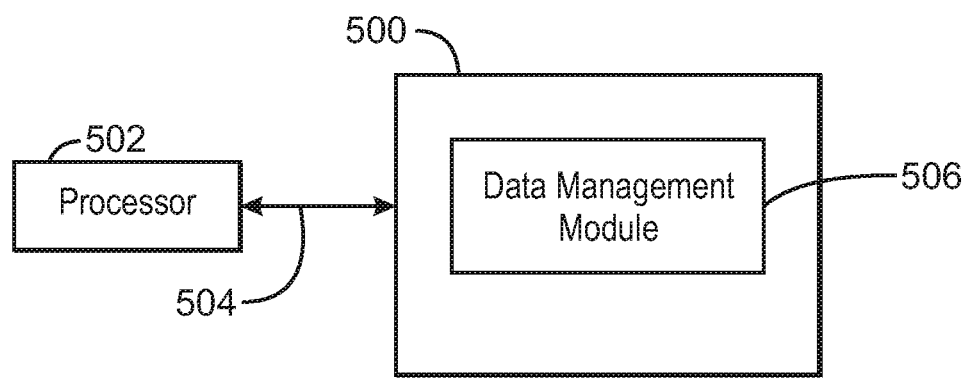
FIG. 5 is a block diagram depicting an example of a tangible, non-transitory computer-readable medium that can manage consistent data objects.

FIG. 5 is a block diagram depicting an example of a tangible, non-transitory computer-readable medium that can manage consistent data objects. The tangible, non-transitory, computer-readable medium 500 may be accessed by a processor 502 over a computer bus 504. Furthermore, the tangible, non-transitory, computer-readable medium 500 may include code to direct the processor 502 to perform the steps of the current method.

The various software components discussed herein may be stored on the tangible, non-transitory, computer-readable medium 500, as indicated in FIG. 5. For example, a data management module 506 may be adapted to direct the processor 502 to manage consistent data objects. It is to be understood that any number of additional software components not shown in FIG. 5 may be included within the tangible, non-transitory, computer-readable medium 500, depending on the specific application.

Figure 6:
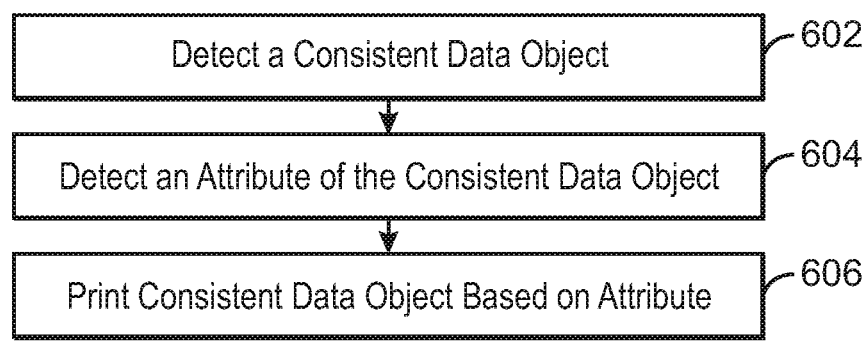
FIG. 6 is a process flow diagram illustrating an example method of printing a consistent data object in a printing device.

FIG. 6 is a process flow diagram illustrating an example method of printing a consistent data object in a printing device. The method 600 can be implemented with a printing device, such as the printing device 126 of FIG. 1. The printing device 126 may include a print object module 128 that can execute operations based on the consistent data objects.

At block 602, the print object module 128 can detect a consistent data object. In some embodiments, the print object module 128 can receive a consistent data object from a data management module 122. For example, the data management module 122 may receive an operation from an application to send a consistent data object to the printing device. In other embodiments, the data management module 122 may send each stored canonical data format of a consistent data object to a printing device. For example, a data management module 122 may send two separate canonical data formats of a consistent data object to the printing device.

At block 604, the print object module 128 can detect an attribute of the consistent data object. In some embodiments, the print object module 128 can detect any number of attributes of the consistent data object. For example, the print object module 128 may detect the data format attribute of a consistent data object.

At block 606, the print object module 128 can print the consistent data object based on the detected attribute. For example, the print object module 128 may print a consistent data object based on one of several canonical data formats. In some embodiments, the print object module 128 may identify the canonical data format to print based on the frequently printed canonical data formats of other consistent data objects. For example, the print object module 128 may print several consistent data objects in a particular canonical data format. The print object module 128 may then select the frequently printed canonical data format as a format to use for printing additional consistent data objects.

In some embodiments, the print object module 128 may also print the consistent data object by creating multiple views of the same consistent data object or image. For example, a first image view may be a colorimetrical accurate view of an image stored in a colorimetric space such as JAB or JCH. In this example, the first image view may be represented as a triplet of 32-bit floating point numbers (J, C, H). The print object module 128 may also create a second image view of the consistent data object that is a color intensity component J of the first image. The print object module 128 may store the second image view as a single plane 8-bit integer image. The second image view can be processed to reveal the outlines of objects. The first image view and the second image view can then be composed together into a final image for printing. The final image may include the first image view as the background and second image view as the foreground overlay outlining particular objects.

The process flow diagram of FIG. 6 is not intended to indicate that the steps of the method 600 are to be executed in any particular order, or that all of the steps of the method 600 are to be included in every case. Further, any number of additional steps may be included within the method 300, depending on the specific application. For example, the print object module 128 may also detect a print format for a consistent data object and convert the consistent data object to a print format. Additionally, the print object module 128 may also store scanned documents and documents received by fax as consistent data objects based on various attributes.

Furthermore, in some embodiments, the print object module 128 may also process the color intensity of an RGB color image, such as the YIQ Y intensity component. The data management module can allow the print object module 128 to read the Y intensity component, process the Y component, and then write the Y component back into the YIQ data view. In some embodiments, the color conversion may be performed within the data management module, which can reduce the size of the software code since the data management module performs the color conversion.

EXAMPLE 1

A method for managing consistent data objects is included herein. The method includes detecting an operation to store a consistent data object and detecting an attribute for the consistent data object. The method also includes storing the consistent data object based on the attribute. Furthermore, the method includes determining an additional format of the consistent data object to be stored. In addition, the method includes generating a second consistent data object based on the additional format. The method also includes storing the second consistent data object.

In some embodiments, the method for managing consistent data objects can also detect a retrieval request for the consistent data object from an application, determine a format of the consistent data object to retrieve, and retrieve the format of the consistent data object. The method can also store the consistent data object based on any number of attributes including a local identifier attribute, a global identifier attribute, a data format attribute, a memory hierarchy attribute, a data object layout attribute, a data object layout attribute, a data lifetime attribute, a data object metadata attribute, or a cryptography attribute. The method can also send a retrieved consistent data object to a print engine, such as a printing device.

EXAMPLE 2

A system for managing consistent data objects is included herein. The system includes a memory device to store a consistent data object, a display device to display the consistent data object, and a processor. The processor can detect an operation to store the consistent data object and determine the consistent data object is not stored in the memory device. The processor can also detect an attribute for the consistent data object. Furthermore, the processor can also store the consistent data object based on the attribute. In addition, the processor can determine an additional format of the consistent data object is to be stored. The processor can also generate a second consistent data object based on the additional format and store the second consistent data object in the memory device.

In some embodiments, the system for managing consistent data objects can also generate a second consistent data object with an inline conversion module. In some embodiments, the inline conversion module can convert a consistent data object of one format to a consistent data object of a second format while a data management module retrieves the data in parallel. Alternatively, the system for managing consistent data objects can store multiple formats of a consistent data object in memory.

EXAMPLE 3

At least one machine readable medium that includes instructions is also included herein. The instructions can detect an operation to store the consistent data object and determine the consistent data object is not stored in the memory device. The instructions can also detect an attribute for the consistent data object. Furthermore, the instructions can store the consistent data object based on the attribute. In addition, the instructions can determine an additional format of the consistent data object is to be stored. The instructions can also generate a second consistent data object based on the additional format and store the second consistent data object in the memory device.

In some embodiments, the instructions can also cause the computing device to detect a retrieval request for the consistent data object from an application, determine a format of the consistent data object to retrieve, and retrieve the format of the consistent data object. Additionally the instructions can also store the consistent data object based on any number of attributes such as a local identifier attribute, a global identifier attribute, a data format attribute, a memory hierarchy attribute, a data object layout attribute, a data object layout attribute, a data lifetime attribute, a data object metadata attribute, or a cryptography attribute.

EXAMPLE 4

A printing device for printing consistent data objects comprising a print object module is included herein. The print object module can detect a consistent data object and detect an attribute of the consistent data object. The print object module can also print the consistent data object based on the attribute of the consistent data object.

In some embodiments, the printing device can also detect a print format and convert the consistent data object from a first data format to the print format. The printing device may also store a scanned document as a consistent data object. In other embodiments, the printing device can also store a document received from a facsimile operation as a consistent data object.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A method for a computing system managing consistent data objects, comprising:
   managing, via a data management module of the computing system, multiple copies of a consistent data object in multiple levels of memory of the computing system, the multiple levels comprising cache and system memory, the managing comprising:
   detecting an operation to store the consistent data object in the memory;
   detecting one or more attributes for the consistent data object;
   storing the consistent data object in the memory based on the one or more attributes as a first consistent data object, wherein the one or more attributes comprise a memory hierarchy attribute that restricts the consistent data object to one or more levels of the memory of the computing system;
   determining an additional format of the consistent data object to be stored in the memory;
   generating a second consistent data object comprising a copy of the consistent data object based on the additional format;
   storing the second consistent data object in the memory;
   detecting a retrieval request for the consistent data object from a hardware component of the computing system or from an application executing on the computer system; and
   determining whether to retrieve the first consistent data object or the second consistent data object based on a format of the consistent data object requested by the hardware component or the application.

2. The method of claim 1, wherein the managing further comprises:
   determining the requested format of the consistent data object;
   providing the first consistent data object or the second consistent data object to the hardware component or the application, wherein the consistent data object is accessible in multiple formats to the hardware components of the computing system or to applications executing on the computing system without data conversion outside the data management module; and
   managing location of the consistent data object in the memory via the memory hierarchy attribute.

3. The method of claim 2, wherein the first consistent data object comprises a first format, and the second consistent data object comprises the additional format comprising a second format different than the first format, wherein retrieval request originates from the application.

4. The method of claim 2, wherein determining a format of the consistent data object to retrieve comprises detecting the format of the consistent data object to retrieve from a data object view.

5. The method of claim 1, wherein the one or more attributes comprise a local identifier attribute comprising a common memory address space of the computing system.

6. The method of claim 1, wherein the first consistent data object comprises data having a first bit-precision format, and wherein the second consistent data object comprises the data having the additional format comprising a second bit-precision format different than the first bit-precision format, and wherein the first consistent data object and the second consistent data object are accessible by multiple processors of the computing system via the data management module.

7. The method of claim 1, wherein the one or more attributes comprise a shadow copy format that indicates a set of data is to be formatted based on a size of a cache line.

8. The method of claim 1, wherein the memory hierarchy attribute to manage location of the consistent data object within a memory hierarchy comprising L1 cache, L2 cache, and the system memory, and wherein the additional format is a format requested by a processor of the computing system.

9. The method of claim 1, comprising the data management module sending the first consistent data object to a print engine, wherein the multiple copies have different respective formats.

10. The method of claim 1, wherein generating the second consistent data object based on the additional format comprises updating an existing copy of the consistent data object, and wherein the memory hierarchy attribute restricts the consistent data object to reside in one or more levels of the memory.

11. The method of claim 1, comprising the application sending a store operation to the data management module to store the consistent data object in the additional format, wherein the store operation originates from the application stored on a storage device of the computing system, wherein the first consistent data object comprises a digital image having a first format, and wherein the second consistent data object comprises the digital image having the additional format comprising a second format different than the first format.

12. The method of claim 1, comprising the hardware component of the computing system sending a store operation to the data management module to store the consistent data object in the additional format, wherein the hardware component comprises a graphics processing unit (GPU).

13. The method of claim 1, wherein the additional format comprises a canonical data format comprising a format requested by the hardware component of the computing system and the request for the additional format originating from the application executing on the computing system and stored in a storage device of the computing system.

14. The method of claim 13, wherein the canonical format comprises a color format that facilitates computing system via the data management module to perform color conversions at a speed substantially equal to a direct memory access (DMA) rate of the computing system.

15. A computing system for managing consistent data objects comprising:

memory comprising cache and system memory, the memory to store a consistent data object comprising a data structure; and a data management module executable by the computing system to manage copies of the consistent data object in multiple levels of the memory, comprising by the data management module to:

detect an operation to store the consistent data object;

determine the consistent data object is not stored in the memory;

detect an attribute for the consistent data object;

store the consistent data object based on the attribute as a first consistent data object comprising the data structure;

determine an additional format of the consistent data object to be stored;

generate a second consistent data object comprising the data structure based on the additional format;

store the second consistent data object in the memory;

detect a retrieval request for the consistent data object from a hardware component of the computing system or from an application executing on the computer system;

determine whether to retrieve the first consistent data object or the second consistent data object based on a format of the consistent data object requested by the hardware component or the application; and provide the first consistent data object or the second consistent data object to the hardware component or the application.

16. The computing system of claim 15, wherein the data management module executed by the computing system to:

detect a retrieval request for the consistent data object from an application executing on the computing system; and determine the requested format of the consistent data object, wherein the data management module, via the processor, to maintain multiple copies of the consistent data object in different respective formats, wherein the attribute comprises a memory hierarchy attribute to manage the consistent data object in a memory hierarchy of the computing system.

17. The computing system of claim 16, wherein the memory hierarchy attribute to provide for the consistent data object to be migrated through levels of memory based on a virtual memory policy of the computing system.

18. The computing system of claim 15, wherein the attribute comprises a data lifetime attribute, and wherein the data management module executed by the computing system to detect the requested format of the consistent data object to retrieve from a data object view.

19. The computing system of claim 15, wherein the first consistent data object and the second consistent data object are accessible by multiple processors in the computer system via the data management module, and wherein to generate a second consistent data object comprises the computing system to create the second consistent data object by an inline conversion module of the data management module in the computing system, and wherein the computing system is a mobile phone, a laptop computer, a desktop computer, a scanning device, a camera, an imaging device, or a tablet computer.

20. The computing system of claim 15, wherein the data management module executed by the computing system to send the first consistent data object and the second consistent data object to a print engine, wherein the first consistent data object comprises the data structure having a first bit-precision format, and wherein the second consistent data object comprises the data structure having the additional format comprising a second bit-precision format different than the first bit-precision format.

21. The computing system of claim 15, wherein generating a second consistent data object based on the additional format comprises updating an existing consistent data object.

22. The computing system of claim 15, wherein the data management module via the processor to provide data conversions for read and write operations between copies of the consistent data object comprising the data structure and having same data under different data format views.

23. A non-transitory machine-readable medium comprising instructions that, in response to being executed on a computing device, cause the computing device to:

manage copies of consistent data objects of multiple formats in levels of memory of the computing device, the levels comprising cache and system memory, wherein to manage comprises to:

detect an operation to store in the memory a consistent data object having a first format;

detect a memory hierarchy attribute for the consistent data object to restrict the consistent data object to reside in one or more levels of the memory;

store a first copy of the consistent data object in the memory as a first consistent data object based on the memory hierarchy attribute;

determine a second format of the consistent data object to be stored in the memory;

generate a second copy of the consistent data object as a second consistent data object based on the second format; and store the second consistent data object in the memory; and determine whether to retrieve from the memory the first consistent data object or the second consistent data object based on a requested format of the consistent data object.

24. The non-transitory machine-readable medium of claim 23, wherein the instructions cause the computing device to:

detect a retrieval request for the consistent data object from a hardware component of the computing device or from an application executing on the computing device; and determine the requested format of the consistent data object, wherein the first consistent data object comprises first data having the first format, wherein the second consistent data object comprises the first data having the second format, and wherein the second format comprises a canonical data format comprising a format requested by a hardware component of the computing system.

25. The non-transitory machine-readable medium of claim 23, wherein the first consistent data object comprises a digital image having the first format, and the second consistent data object comprises the digital image having the second format.

* * * * *